(12) United States Patent
Brindle (10) Patent No.: US 8,135,893 B2
(45) Date of Patent: Mar. 13, 2012

(54) SYSTEM, APPARATUS AND METHOD FOR GRANTING ACCESS TO A SHARED COMMUNICATIONS BUS

(75) Inventor: Ralph C. Brindle, Edina, MN (US)

(73) Assignee: Honeywell International, Inc., Morristown, NJ (US)

( * ) Notice: Subject to any disclaimer, the term of this patent is extended or adjusted under 35 U.S.C. 154(b) by 222 days.

(21) Appl. No.: 12/209,623

(22) Filed: Sep. 12, 2008

(65) Prior Publication Data
US 2010/0070666 A1    Mar. 18, 2010

(51) Int. Cl.
*G06F 12/00* (2006.01)
(52) U.S. Cl. .......................... 710/117; 710/200; 710/240
(58) Field of Classification Search .................. 710/117, 710/240–244, 305–306, 442, 200
See application file for complete search history.

(56) References Cited

U.S. PATENT DOCUMENTS

| | | | |
|---|---|---|---|
| 4,627,046 A * | 12/1986 | Bellamy ..................... 370/359 |
| 5,138,610 A | 8/1992 | Kohlmann et al. |
| 5,173,898 A | 12/1992 | Heinzmann et al. |
| 5,721,834 A * | 2/1998 | Milhaupt et al. .............. 710/100 |
| 5,838,937 A | 11/1998 | Lee et al. |
| 6,138,200 A * | 10/2000 | Ogilvie ......................... 710/244 |
| 6,307,835 B1* | 10/2001 | Kasper .......................... 370/229 |
| 6,654,833 B1* | 11/2003 | LaBerge ....................... 710/107 |
| 6,874,048 B2 | 3/2005 | Knapp et al. |
| 2003/0115369 A1* | 6/2003 | Walter et al. .................. 709/253 |
| 2005/0094665 A1 | 5/2005 | Nalawadi et al. |
| 2005/0094674 A1 | 5/2005 | Zinke et al. |
| 2005/0237928 A1* | 10/2005 | Le Scolan et al. ............ 370/223 |

* cited by examiner

*Primary Examiner* — Brian Misiura
*Assistant Examiner* — Kim T Huynh
(74) *Attorney, Agent, or Firm* — Hollingsworth & Funk, LLC (57) ABSTRACT

Systems, apparatuses and methods for timing access to a shared communications bus by a plurality of devices. Each of a plurality of nodes is successively provided an opportunity to gain access to a shared bus according to a time slot allocation referenced from a time reference. The successive time slot allocation occurs until one of the nodes has a message to send via the shared bus. The node that has the message to send transmits a frame onto the bus. A new time reference is established at each of the nodes based on an indication provided by the transmitted frame, whereby each of the nodes can then be afforded a new opportunity to gain access to the shared bus according to the time slot allocation referenced from the new time reference.

24 Claims, 7 Drawing Sheets

SYSTEM, APPARATUS AND METHOD FOR GRANTING ACCESS TO A SHARED COMMUNICATIONS BUS

FIELD OF THE INVENTION

This invention relates in general to communications, and more particularly to systems, apparatuses and methods for avoiding collisions on a shared communications bus using time slot allocations.

BACKGROUND OF THE INVENTION

Systems employing numerous devices often require or otherwise benefit from the ability for these devices to communicate with one another. While each device or "node" may have its own purpose and responsibilities, they often need to transmit information to, and/or receive information from, other devices of the system. Such nodes can communicate in various communication and network topologies, some of which include sharing a common bus. Multiple nodes that share a common bus can experience collisions unless collision avoidance techniques are employed. Generally, a collision refers to a situation where two or more nodes transmit data on a shared bus at the same time. When this occurs, data corruption and/or other transmission errors can result.

Communications protocols between multiple nodes that share a common bus may provide a manner of avoiding collisions among the communicants, such as collision detection and avoidance via random retry, token passing, and time slot assignment. Time slot assignment involves assigning a unique time slot for each device on the bus, during which the respective device can transmit its data. Thus, each device takes turns in transmitting data to avoid data collisions.

However, current collision avoidance techniques utilizing time slot assignments have numerous drawbacks. For example, a significant amount of time may be required to wait until each of the nodes in the system is allocated its transmission time. This consumes valuable bandwidth, particularly where the nodes send messages infrequently enough that many, if not most, of the available time slots are unused.

Another representative drawback of prior art is the memory required in receiving devices. As it is possible that many or all of the transmitting devices may have a message to send during its allocated time slot, a resulting frame that includes the collective data can be quite sizeable due to the aggregate data from each of the nodes. If a given node may be interested in receiving messages from any or all other nodes, it must be prepared to buffer the entire frame. For example, a receiving node may need to buffer data of a size corresponding to the product of the number of possible nodes and the maximum length of each node's message.

There is a need in the communications industry to address these and other shortcomings of the prior art. The present invention solves these and other problems, and offers other advantages over the prior art.

SUMMARY OF THE INVENTION

To overcome limitations in the prior art described above, and to overcome other limitations that will become apparent upon reading and understanding the present specification, the present invention discloses systems, apparatuses and methods for timing access to a shared communications bus by a plurality of coupled devices.

In accordance with one representative embodiment of the invention, a method involves successively providing each of a plurality of nodes an opportunity to gain access to a shared bus according to a time slot allocation referenced from a time reference. This successive time slot allocation occurs until one of the nodes has a message to send via the shared bus. The node that has the message to send transmits a frame onto the bus. A new time reference is established at each of the nodes based on an indication provided by the transmitted frame, whereby each of the nodes can then be afforded a new opportunity to gain access to the shared bus according to the time slot allocation referenced from the new time reference.

In a more particular embodiment of such a method, establishing a new time reference at each of the nodes involves establishing the new time reference based on an end of frame indication provided by the transmitted frame. In another embodiment, the new time reference is established based upon recognition of the end of the transmitted frame, whether that is determined by monitoring the end of the data bits or by identifying some time duration after an indication (e.g., EOF) in the transmitted frame.

In another embodiment, the method further involves assigning an allocation order in which each of the nodes is allowed to sequentially gain access to the shared bus. For example, assigning an allocation order may involve providing each of the nodes the opportunity to access the shared bus in an order corresponding to an increasing order of the addresses of the plurality of nodes.

In another embodiment, the method further involves each of the nodes receiving and framing the transmitted frame in order to at least identify the indication provided by the transmitted frame. In a more particular embodiment, the method further involves each of the nodes buffering the transmitted frame transmitted by the transmitting node. Such a buffer may, in some embodiments, be used for both receiving frames and as a temporary buffer prior to transmitting a frame.

In another embodiment of such a method, each allocated time slot is of a lesser time duration than a maximum length of the message sent by the plurality of the nodes. In yet another embodiment, each allocated time slot has a time duration sufficient to enable a listening node on the shared bus to identify that a message has been transmitted. In another embodiment, transmitting the frame from the node involves initiating transmission of the frame during the time slot of the sending node and transmitting the frame for a time that would have otherwise encompassed one or more other subsequent time slots allocated to other listening nodes.

In accordance with another method of the invention, a device determines when it has an opportunity to transmit data on a shared bus based on its time slot allocation order relative to a time reference. Data (e.g., a frame) transmitted from another device onto the shared bus prior to the device's opportunity to transmit is recognized by the device, which in turn frames the transmitted data to at least identify an end of frame indication. A new time reference is established based on or otherwise determined from the end of frame indication. The device then determines when it has a new opportunity to transmit data on the shared bus based on its time slot allocation order relative to the new time reference.

In one embodiment, such a method further involves determining whether the device is a destination of the transmitted data based on a destination address identified by framing the transmitted data.

In another embodiment, the method further involves recognizing that no data signals have been transmitted from another device onto the shared bus prior to the device's opportunity to transmit, and transmitting a frame from the device onto the bus at the device's time slot allocation order relative to the new time reference.

In another embodiment of such a method, recognizing a frame transmitted onto the shared bus involves recognizing signals present on the shared bus.

In another embodiment, determining when the device has an opportunity to transmit data involves measuring a time until the device's time slot presents itself in the time slot allocation order.

In accordance with another embodiment of the invention, an apparatus capable of communicating via a shared bus is provided. The apparatus includes at least a receiver and a programmed processing arrangement. The receiver is coupled to the shared bus and is configured to receive data originating from other nodes coupled to the shared bus. The processor is configured to determine when the apparatus is allowed to transmit a message based on a time slot allocated for the apparatus relative to a time reference. The processor is further configured to frame the data received prior to the apparatus' time slot, to establish a new time reference based on an indication in the received data, and to determine when the apparatus is allowed to transmit a message based on the time slot relative to the new time reference.

In another embodiment, the processor is further configured to frame an outgoing message when the apparatus is allowed to transmit a message during its time slot. The transmitter is configured to transmit the outgoing message via the shared bus.

In another embodiment of such an apparatus, the processor is configured to establish the new time reference based on an end of file indication in the received/framed data. In still another embodiment, the processor comprises a framing module configured to frame the received data to identify the end of file indication in the received data by which the new time reference is established.

In another embodiment, the apparatus further includes a buffer configured to buffer the received data, where the buffer has a capacity commensurate with a size of the largest single data block sent by any of the other nodes coupled to the shared bus.

In accordance with another embodiment of the invention, a system is provided that includes at least a shared communications bus and a plurality of environmental devices each capable of communicating via the shared communications bus. Each of the environmental devices includes circuitry and/or a programmed processing device(s) configured to determine when the respective device has an opportunity to transmit a frame on the shared communications bus based on the respective device's time slot allocation order relative to a time reference. The circuitry and/or programmed processing device(s) is further configured to receive frames originating from the one or more other environmental devices coupled to the shared bus, to frame the received frame to at least identify an end of the received data frame, and to establish a new time reference based on the end of the received data frame for determining subsequent frame transmission opportunities.

In various embodiments of the invention, the environmental devices may include any one or more of a temperature sensor, humidity sensor, thermostat, HVAC controller, etc.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides manners of timing access to a shared communications bus. Multiple devices or "nodes" may be coupled to the shared bus, and contend for bus allocation to transmit messages or other data to one or more other nodes. In one embodiment of the invention, each of the nodes is successively given an opportunity to gain access to the shared bus. These successive opportunities are effected by way of time slot allocations, where each node has a different time slot in which it can transmit its data. The time slots are referenced from a time reference known to each of the nodes, so that each node can similarly determine when it is its turn to transmit data. In accordance with the invention, each node is given an opportunity to access the bus during its respective time slot, until one of the nodes has a message (or other data) to send via the bus. That node then transmits its data via the bus, such as by way of a data frame. In one embodiment, each of the other nodes on the bus listens for bus signaling. When the transmitting node transmits the frame, each of the other listening nodes receives the frame, and establishes a new time reference from which it restarts its time slot measurements to determine when it is its turn to transmit data relative to the new time reference. In one embodiment, establishing the new time reference is based on an indication provided by or otherwise made known by the transmitted frame, such as an end of frame (EOF) indication or other indication that transmission of the frame has completed. In this manner, a message is transmitted on the bus as soon as one of the nodes has a message to send during its time slot, and time slots that would have otherwise occurred afterwards are disregarded in lieu of establishing a new time reference and restarting the time slot allocations for the nodes.

In order for multiple nodes to share a bus for purposes of transmitting messages using time slot assignments, each node can determine when it is its turn to transmit based on a node-specific delay from a time reference. Each time the reference is noted, each node can wait for its time to transmit relative to the time reference. In prior systems, each data frame possibly including a collection of messages from each node begins with a time reference message, and concludes when all possible nodes have had a chance to transmit. In such a system, one and only one node is designated to supply the time reference messages for the bus. Such a protocol requires each node to have an opportunity to transmit a message during every transmitted frame. The maximum message length transmitted by each node is determined at design time, as the duration of each time slot cannot exceed the time required to transmit a maximum length message. If a given node is interested in receiving messages from any or all other nodes, it must be prepared to buffer the entire frame; i.e. the number of possible nodes times the maximum length of a message.

Consequently, such prior art systems require sufficient memory or other storage at each node to buffer an entire frame of multiple messages from as many as all other nodes. This consumes significant, valuable memory resources at each node. It is advantageous to reduce the amount of memory required at such nodes. Further, such a system can potentially waste a great deal of bandwidth. For example, assume a system having N nodes, and assume that one node (Node-A) has data to send in a message. All N nodes will be allocated a time slot, yet only Node-A will provide a message during its time slot. Therefore, all other N−1 nodes had no data to send, yet time was wasted waiting during the time slots for each of the other N−1 nodes that did not have data to send. This consumes bandwidth, and adversely affects the efficiency of message delivery in the system. It would be desirable to reduce wasted bandwidth and to more effectively utilize the available bandwidth. Bandwidth can also be wasted where the time slot allocations are themselves wide in length (i.e. lengthy time periods for each time slot). Thus, it would be advantageous to decrease time slots to a shorter time, to more quickly identify the next node needing to transmit data. The present invention solves these and other problems of the prior art.

As described in greater detail below, the present invention provides an efficient manner of timing node access to a shared communications bus. Each node can communicate with the other nodes on the bus. Each node need only supply a single buffer having a capacity only as large as the maximum single message size for any one of the nodes. The invention therefore reduces buffer size requirements for each node, as each node does not have to buffer an entire frame of messages from other nodes. Instead of giving each node a transmit opportunity in each time slot period, one embodiment allows at most one node to send a message during a given time slot period, and thus only one message from one node will be included in a transmitted frame. The maximum length of a message is not limited by the protocol, but rather by the smallest buffer size implemented at any node. Additionally the same buffer can, in some embodiments, be used for both transmitting and receiving messages.

In accordance with the invention, bandwidth is not routinely wasted on nodes that have nothing to transmit. In one embodiment described more fully below, the first node that has a message to transmit occupies the current frame, and another frame begins immediately afterwards, without waiting for other time slots to expire. As described more fully below, one embodiment accomplishes this by having each message treated as the new time reference for the next frame; that is, the end of each message transmitted onto the bus signals the time reference for the next frame. The only time a full frame of empty time slots is consumed in one embodiment is when none of the nodes have anything to transmit during the given time period. Even in such a case, the bandwidth has not been wasted, but has simply not been used during that time period.

Additionally, the duration of a time slot need not have a width (i.e. time) sufficient to accommodate an entire length of a message. Rather, in accordance with one embodiment of the invention, the time slot duration can be much shorter than the maximum length of a message. In one embodiment, time slots are only as wide as required to ensure they do not overlap when timing tolerances are considered. A time slot of a small number of characters can suffice to identify a message being transmitted, while the remainder of the message can bleed over into what would have otherwise been succeeding time slots. This is possible because only one message will be included in the data frame, and those time slots following the time slot of the transmitting node will not be considered until the next frame. In one embodiment, the maximum single message length can even be designed to be larger than the total duration of all time slots, if desired. With the proper message framing, messages shorter than the maximum length do not consume the bandwidth of a maximum length message. Each message is only as long as it needs to be, and the next frame begins immediately following it.

Figure 1A:
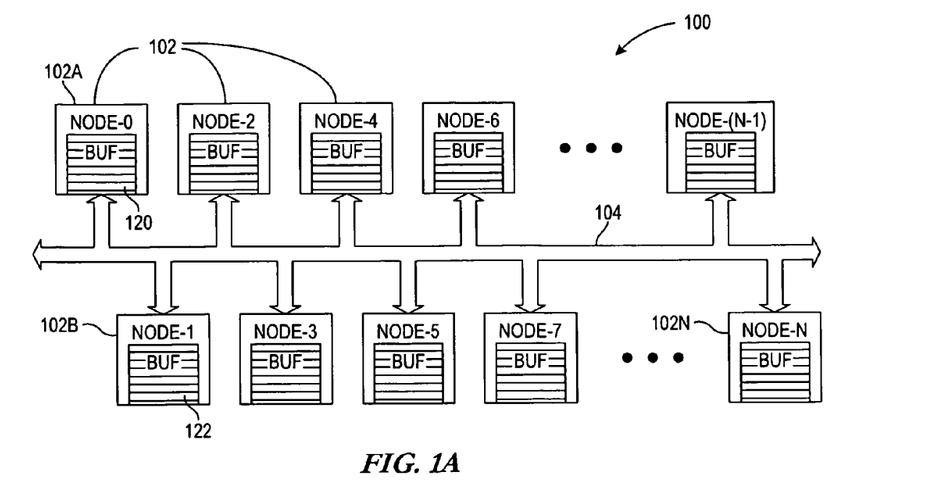
FIG. 1A is a block diagram generally illustrating a system of nodes that can communicate via a shared bus.

FIG. 1A is a block diagram generally illustrating a system 100 of nodes 102 that can communicate via a shared bus 104. FIG. 1A depicts an indeterminate number of nodes, labeled NODE-0 102A through NODE-N 102N. For purposes of the embodiment of FIG. 1A, it is assumed that any node can communicate information to and/or from any other node. While numerous nodes are depicted in the representative system of FIG. 1A, the invention is applicable to any system 100 including two or more nodes.

Each of the nodes is allocated at least one time slot relative to a time reference in which it can transmit data. For example, NODE-0 102A may be allocated a first time slot $T_{SLOT-0}$ relative to the time reference, at which time NODE-0 102A can signal the bus 104. The next node, NODE-1 102B, may be allocated the next time slot $T_{SLOT-1}$ relative to the time reference, at which time NODE-1 102B can signal the bus 104. The order in which nodes can access the bus at their respective time slots may be determined in advance, determined randomly, etc. In one embodiment, the order of each node's time slot corresponds to the order of each node's address relative to the other nodes on the bus 104.

Figure 1B:
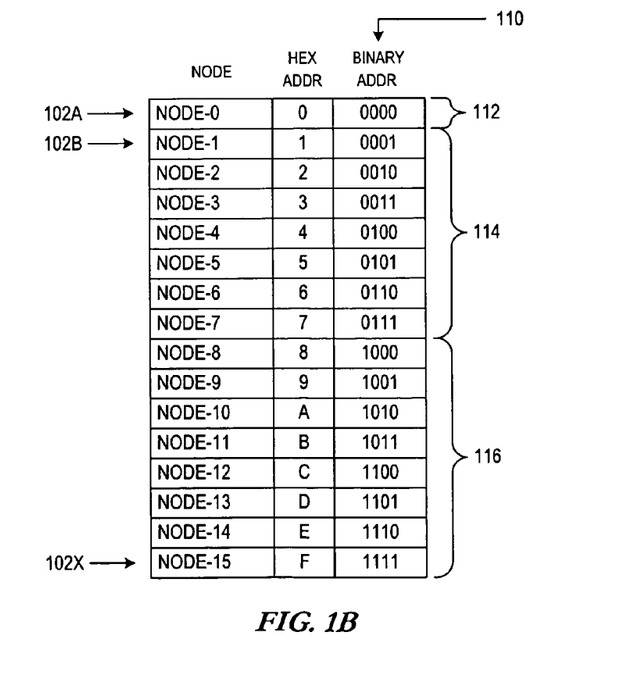
FIG. 1B charts a representative group of nodes and an exemplary manner of how such nodes can be allocated time slots for communicating via the shared bus.

For example, assume there are sixteen nodes 102 in the system 100, labeled NODE-0 102A through NODE-15 102X as shown in FIG. 1B. Like reference numbers to those in FIG. 1A are used where applicable. In the example of FIG. 1B, each node or device is assigned a unique 4-bit address, shown in column 110. In one embodiment, the node 102A at address-0 (binary 0000) can signal the bus during $T_{SLOT-0}$; the node 102B at address-1 (binary 0001) can signal the bus during $T_{SLOT-1}$, etc. In this manner, each of the nodes 102 is allowed to signal the bus 104 at different allocated times relative to a time reference. While the order of time slot allocation need not correlate to the addressing order, one embodiment of the invention utilizes such an approach.

As will be described in greater detail below, some nodes 112 may be reserved. In the case where the time slot allocation order corresponds to the address order, one or more devices that generate priority data may be designed so their addresses are set or selectable at lower addresses (e.g. 114), so that their time slot allocations arise earlier than other nodes relative to the time reference. This inherently gives lower address devices 114 priority in accessing the bus 104 over devices with higher addresses 116. Again, this assumes an embodiment where the nodes are granted access to the bus in time slots corresponding to an increasing order of the nodes' addresses.

Returning to FIG. 1A, each of the nodes 102 includes a buffer. For example, NODE-0 102A includes at least one buffer 120, NODE-1 102B includes buffer 122, etc. The buffer can be implemented in any memory, registers, or any other storage available at the respective node 102. Each node 102 need only supply a single buffer (e.g. 120, 122, etc.) having a capacity as large as the maximum single message size for any one of the nodes, as is described in greater detail below. While the buffer may be larger, it need only be of sufficient size to accommodate the maximum single message size for any one of the nodes. In prior art systems, each node stored the contents of an entire frame, which could include messages from as many as all other nodes 102 in the system.

Figure 2:
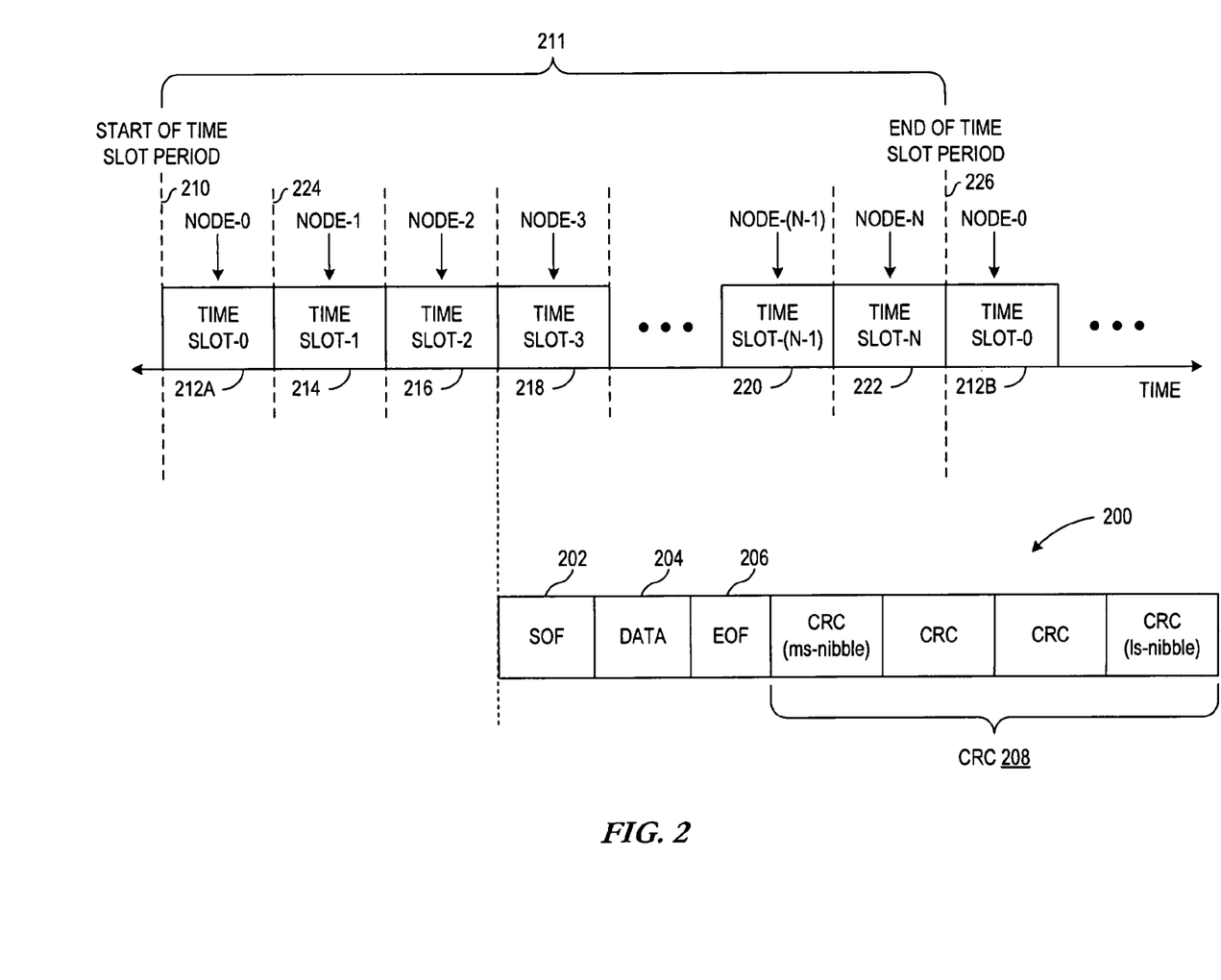
FIG. 2 illustrates a representative group of addressable nodes in which the principles of the present invention may be applied.

As indicated above, one embodiment of the invention involves allowing at most one node to send a message during a given time slot period, rather than giving each node a transmit opportunity in each time slot period. FIG. 2 is a timing diagram illustrating one embodiment of the invention. The embodiment of FIG. 2 assumes some indeterminate number of nodes in the system. The representative nodes of FIG. 2 include NODE-0, NODE-1, NODE-2, NODE-3, through NODE-N.

FIG. 2 illustrates a representative data frame 200. While the frame 200 is described in terms of a data link layer frame at the data link layer, the present invention is applicable to other message encapsulation protocols and various networking levels. The frame 200 is bounded by a start of frame (SOF) 202 and an end of frame (EOF) 206. As described more fully below, the message data from a node is provided in the data field 204. In one embodiment, each frame 200 concludes with a cyclic redundancy check (CRC) 208, which may be used as a checksum to detect whether any data changed from the time of frame transmission. The representative CRC 208 is depicted as a 2-byte CRC.

Each bus device or "node" is assigned a time slot relative to a time reference, shown in FIG. 2 as the start 210 of time slot period 211. Each node waits until its time slot to signal the bus. In the illustrated embodiment, it is assumed that each node is assigned a time slot in an order that corresponds to the order of its address relative to other nodes. Thus, NODE-0 is allowed to signal the bus during time slot-0 212A, NODE-1 is allowed to signal the bus during time slot-1 214, NODE-2 is allowed to signal the bus during time slot-2 216, NODE-3 is allowed to signal the bus during time slot-3 218, NODE-(N−1) is allowed to signal the bus during time slot-(N−1) 220, and NODE-N is allowed to signal the bus during time slot-N 222. In such an embodiment where the node's address is associated with its order of time slot allocations, the low order addresses inherently have priority, as the nodes with lower order addresses are allocated earlier time slots.

In one embodiment, all devices with addresses greater than 0 (or the lowest address used) wait for some period of time before they are presented with the opportunity to signal the bus. For example, if a device with address N has a message to send and has waited for $((N-1) \times T_{SLOT})$ without detecting any signaling on the bus, then it may send a message frame. In this example, $T_{SLOT}$ represents the time slot for each device, such as the time between start 210 of the time slot period 211 and time 224. In one embodiment, each of the time slots has the same duration, but this is not required.

In one embodiment, each node on the bus monitors for signals on the bus, whether or not it has a message to send. During this time, each of the nodes is given its own time in the time slot period 211 in which to send a message. When any node sends a message during its allocated time to send a message, no other node whose time slot allocation follows the sending node's time slot allocation will be allowed to send a message during that time slot period 211. For example, assume that neither NODE-0 nor NODE-1 sent a message during its respective time slot 212A, 214. If NODE-2 then sends its message during time slot-2 216, none of the nodes having subsequent time slot allocations will send a message during that time slot period 211. For example, if NODE-2 sends its message during time slot-2 216, none of the nodes (NODE-3, NODE-(N−1), NODE-(N)) associated with subsequent time slots 218, 220, 222 will be afforded an opportunity to send any message until the next time slot period. Thus, in one embodiment, instead of affording each node a transmit opportunity in each time slot period (and thus in each transmitted frame), at most one node is allowed to send a message during a given time slot period 211 and resulting frame. Consequently, each of the listening nodes on the bus needs to buffer only the one message transmitted by the sending node, which significantly reduces the amount of storage that each node on the bus needs to provide.

In one embodiment, each node on the bus monitors for signals on the bus during at least those time slots other than its own. When each node determines that a frame or other data is being sent, it frames the bus signals transmitted on the bus. Framing the bus signals allows each of the other nodes on the bus to determine, among other things, whether the associated message is targeted for that respective node. Further, as described below, framing the message enables each node to identify the end-of-frame (EOF) 206 for the communicated frame.

In accordance with an exemplary embodiment of the invention, when a node sends a message, the sent message includes an indication that is treated as a time reference for the next time slot period. In one embodiment the end of each message transmitted onto the bus represents the time reference for the next frame. If a node sends a message during its time slot, other nodes are prohibited from sending a message during that time slot period, and a new time slot period begins at the end of the message. For example, assume that NODE-3 sends a message during time slot-3 218. The representative frame 200 sent by the node shows that an end-of-frame (EOF) field 206 is provided. As indicated above, other nodes on the bus listen for bus signals and frame the information communicated on the bus. Each other node can therefore identify the EOF field 206, which is used by the listening nodes on the bus as the new start of reference frame 210 for the next frame. In one embodiment, any indication or determination that the transmitted message has ended can serve as the trigger for starting the next time slot period. For example, in one embodiment the end of the frame is actually the end of the CRC 208, which represents the end of the message. The end of the message may be based on an identification of the EOF 206 and the listening nodes' knowledge of the appended CRC 208. In any case, depending on which node sends a message via a frame, the start of time slot period 210 will begin anew when the EOF 206 (or CRC, or other indication that may or may not be based on the EOF 206) of the sent frame is recognized by each of the listening nodes on the bus. While the EOF 206 serves as the indicator by which the listening nodes base the new start of time slot period, other indicators in the transmitted frame may alternatively be used as indicated above.

It is possible that none of the nodes on the bus will have a message to send during a time slot period. If none of the nodes has a message to send during its allocated time slot, no messages will be sent that include an EOF 206 that can be used as the new start 210 of reference frame 211. In one embodiment, if none of the nodes sends a message during its time slot, a backstop message is sent whose purpose is to identify the time reference for the next frame. In one embodiment, one and only one node on the bus takes responsibility for sending such backstop messages, although multiple nodes may coordinate amongst themselves or be directed by another device to alternate or otherwise determine which node will send a backstop message.

Figure 3A:
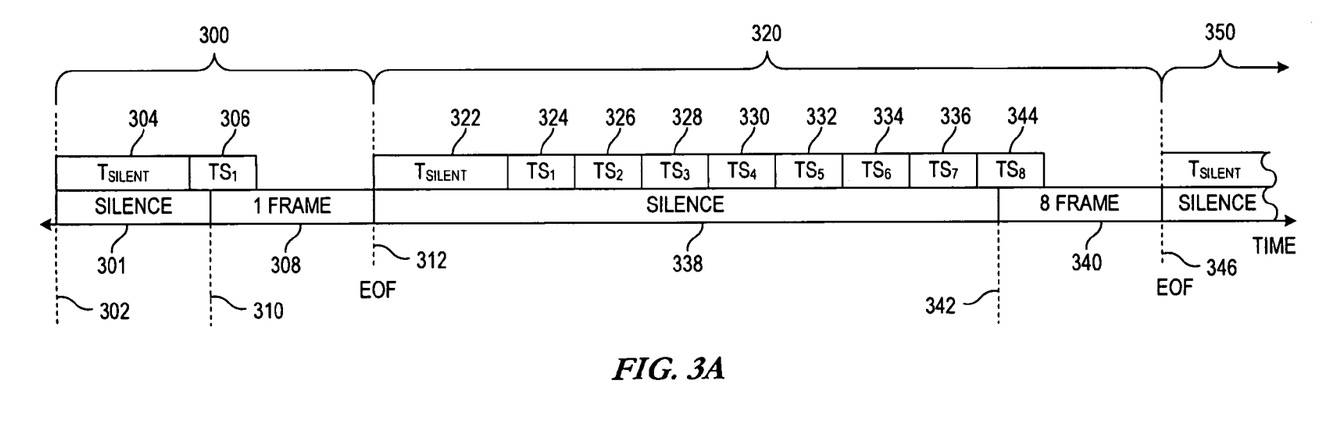
FIG. 3A is a timing diagram illustrating a representative embodiment for timing access to a shared communications bus in accordance with the invention.
Figure 3B:
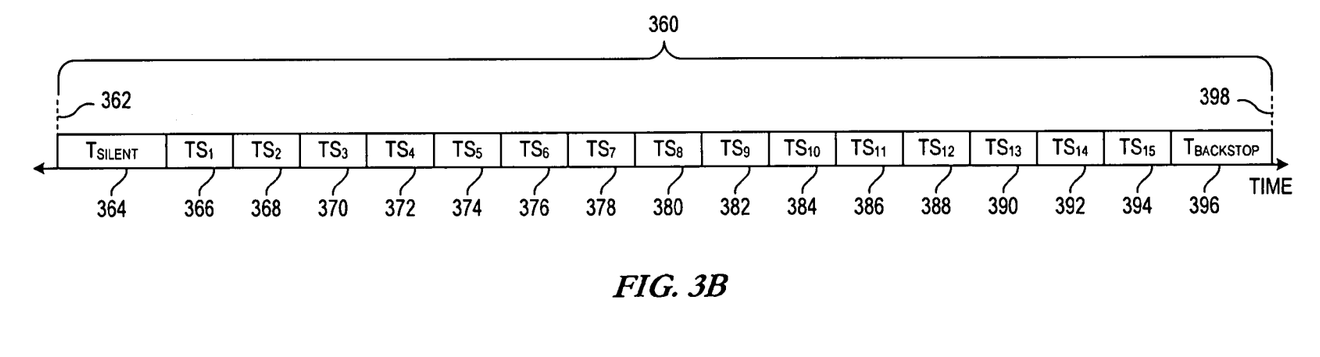
FIG. 3B is a timing diagram illustrating a representative embodiment for timing access to a shared communications bus where no node sends a message during the time slot period.

If none of the nodes sends a message during any of their respective time slots 212A, 214, 216, 218, 220, 222, then a designated node can send a backstop message that resets the start of the time slot period for the next frame, such as to correlate with the end of time slot period 226 or thereafter by some delay. Thus, each node is again allocated a time slot, as shown by NODE-0 getting its time slot-0 212B for this subsequent frame. Backstop messages are described in greater detail in connection with FIG. 3B FIG. 3A is a timing diagram illustrating a representative embodiment for timing access to a shared communications bus in accordance with the invention. Each bus device (node) is assigned a time slot following the completion of a message frame during which it is permitted to signal the bus. In the illustrated embodiment of FIG. 3A, the time slots are represented by $TS_N$, where N corresponds to the node that can transmit a message during that time slot. It is also assumed that the increasing order in which time slots are allocated corresponds to the increasing order of the addresses of the nodes.

In the illustrated embodiment, there is a scheduled period 301 of bus silence from the start 302 of the time slot period 300. This optional period of silence may be used to ensure that a priority device or tool can be given priority to the bus if desired. For example, in one embodiment the device (e.g. NODE-0) at the lowest address may be a computer tool that is allowed to access the bus almost immediately (e.g. after a short turnaround delay) after the end of a different message frame. In one embodiment, from the viewpoint of the supporting computer tool, the silence period 301 in the $T_{SILENT}$ time slot 304 may represent a wider window of time during which the computer tool can transmit, as compared with the more narrow $T_{SLOT}$ time slots provided for other devices/nodes. In one embodiment a wider time slot 301 permits the computer tool to operate without the need to implement tight timing requirements. Again, such a $T_{SILENT}$ time slot 304 is optional, as the first time slot can instead be provided for any one of the system nodes.

Each of the other devices then waits its turn to have access to the bus. Each waits for a period of silence before transmitting. In other words, in one embodiment a node will not transmit a pending message during a given frame if any of the nodes allocated preceding time slots sent a message. Assuming time slot allocation priority is commensurate with the value of a node's address relative to other nodes, the node having an address N can send its message after it has waited for a time shown in Equation 1:

$$T_{SILENT} + ((N-1) \times T_{SLOT}) \qquad \text{EQUATION 1}$$

For example, if NODE-3 has an address of 3, it waits for a period two times the duration of $T_{SLOT}$ plus the initial $T_{SILENT}$ period 304 to reach its allocated time slot in which it can transmit a frame that includes its message.

A representative manner in which nodes access a shared bus in accordance with the principles of the present invention is now described in connection with FIG. 3A. Each of the nodes begins timing a first time slot period 300 from a time reference 302 to its allocated time slot. In the example of FIG. 3A, the node associated with time slot 1, $TS_1$ 306, waits at least the period of silence 301. In this example, the node associated with $TS_1$ 306 has a message to send during its time slot, and therefore transmits a frame 308 at time 310. The nodes having time slots following $TS_1$ 306 will not attempt to send a message during the frame 308 transmission. As described more fully below, each of the other nodes listening on the bus will frame the message, such as by framing the start and end of the message, determining if the CRC is valid, processing the message if it is targeted for it, etc.

In connection with this framing, each node can recognize the EOF 312 of the frame 308. In accordance with embodiments of the invention, this EOF 312 serves as the new time reference for the next time slot period 320. In other embodiments, the new time reference is "based on" the EOF 312, from which the actual end of the message can be determined (e.g., after an appended CRC) or after some time duration, etc. The prior message from frame 308 has been transmitted and recognized by other nodes on the bus, and it is time to monitor for a subsequent frame relative to the new time reference 312. A new $T_{SILENT}$ period 322 may or may not be provided. Then, each of the other devices again waits its turn to have access to the bus. In the illustrated embodiment, the nodes having been allocated time slots $TS_1$ 324, $TS_2$ 326, $TS_3$ 328, $TS_4$ 330, $TS_5$ 332, $TS_6$ 334 and $TS_7$ 336 have no message to send. During this time, the bus is "silent" 338 in that no message signals have been transmitted via the bus. The node having been allocated time slot $TS_8$, on the other hand, has a message to send, and thus initiates transmission of a frame 340 at time 342 during its allocated time slot $TS_8$ 344. Again, each of the other nodes on the bus will frame the message and ultimately identify the EOF 346. The EOF 346 then serves as the new time reference for the next time slot period 350, and so forth.

As can be seen by the example of FIG. 3A, the start time reference is reset after one message has been transmitted via a frame on the bus. Each time slot period 300, 320, 350, etc., may be of different lengths, depending on which (if any) of the nodes sends a message. Each time slot period 300, 320, 350 thus involves allowing each of the nodes to have a chance to send a message, until one of the nodes in fact sends a message. At that time, all other listening nodes process the message, identify the EOF for the frame carrying the message, and reset the new time reference for the next time slot period based on the EOF. It should be recognized that the new time reference may be set to the same time as the EOF is recognized in a node, or may be set at the actual end of the received frame or at some predetermined time period after the EOF or other indication is recognized.

As seen from the embodiment of FIG. 3A, each bus device is assigned a time slot following the completion of a message frame during which it is permitted to signal the bus. In one embodiment, all devices with addresses greater than zero (i.e. the lowest address of the nodes) wait for a period of silence on the line of duration $T_{SILENT}$. Assuming sixteen devices, the next fifteen periods of duration $T_{SLOT}$ represent opportunities for each device to signal the bus. If a device with address N has a message to send and has waited for the time shown in Equation 1 above without detecting any signaling on the bus, it may send a frame.

In one embodiment, the referenced "frames" are data link layer frames. The slot time for $T_{SLOT}$ may be fixed by the data link layer. For example, the slot time may be fixed by the data link layer at five character times, or approximately 5.2 ms. The silent time and slot time may be specified in character times so that the implementer can use a Universal Asynchronous Receiver/Transmitter (UART) for timing if desired. In one embodiment, the slot time is chosen to be long enough so that variations in UART clocks among the devices/nodes will not accumulate to enough time to misinterpret a time slot. In one embodiment, a device that wishes to initiate transmission of a frame during its time slot aims to do so after a two character time delay into its time slot. In such an embodiment and further assuming sixteen possible nodes on the bus, if the UART clock (or whatever clock is used to measure the time slots) is within 1% of the desired bit rate, the accumulated error over the worst case $T_{SILENT}+(15 \times T_{SLOT})-80+(15 \times 5)=$ 155 character times will be approximately 1.5 character times. By aiming to signal the bus beginning with the start of the third character time in the slot, a signal that begins 1.5 character times early is still within the slot, and a signal that begins 1.5 character times late is still within the slot.

FIG. 3B is a timing diagram illustrating a representative embodiment for timing access to a shared communications bus where no node sends a message during the time slot period 360. In FIG. 3B, it is assumed that the start 362 of the time slot period 360 includes a $T_{SILENT}$ time slot 362. In the illustrated embodiment, none of the nodes associated with time slots 366-394 have a message to send during the time slot period 360, and therefore no EOF is provided in which other nodes can reset the start of the next time slot period. In such a case, one embodiment involves issuing a backstop message 396. For example, a controller or other designated node(s) can be configured to provide the backstop message 396 so that each node can reset its starting time reference for the subsequent time slot period. In one embodiment, the backstop message 396 also includes an EOF 398 that is recognized by other listening nodes on the bus, and this EOF 398 serves as the start of the reference frame for the next time slot period.

Figure 4:
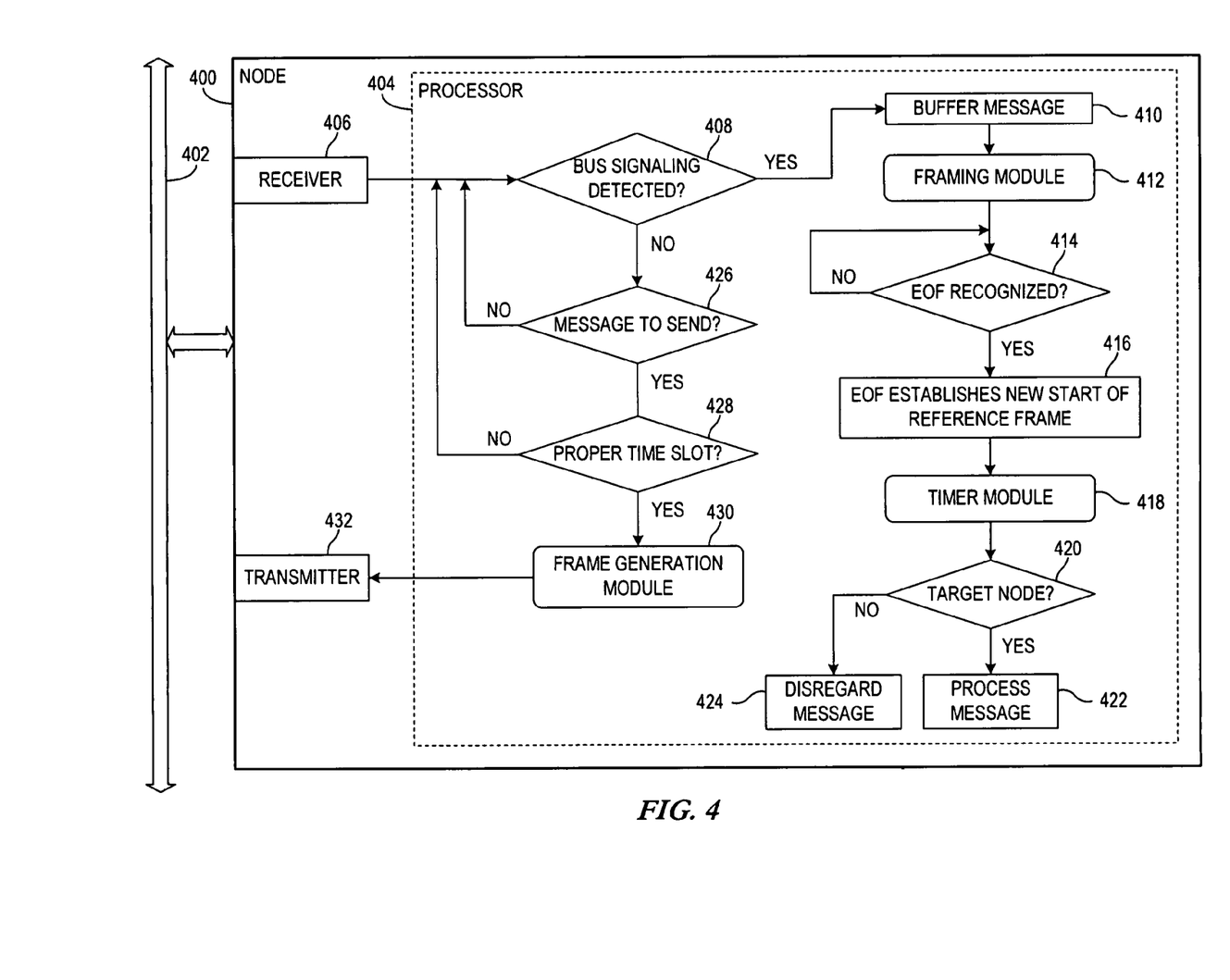
FIG. 4 is a block diagram of a representative device that operates on a shared communications bus in accordance with one embodiment of the invention.

FIG. 4 is a block diagram of a representative device or "node" 400 that operates on a shared communications bus 402 in accordance with one embodiment of the invention. The representative node 400 illustrates representative message receiving and transmitting functions in accordance with embodiments of the invention. The embodiment of FIG. 4 depicts a processor 404, which may include one or more processing units (e.g. single processor unit, co-processors, master/slave processors, etc.). In one embodiment, such a processor 404 is utilized to carry out functions in accordance with the invention, and FIG. 4 assumes such an implementation. However, it should be recognized that discrete circuitry may replace any one or more of the processing functions described in connection with FIG. 4.

For purposes of the description of FIG. 4, it is assumed that the node 400 is one of four nodes that share the bus 402. It is also assumed that each node is allocated a time slot in an order corresponding to the order of the addresses of the four devices. Thus, at least the least significant address bits of the four devices include addresses 0, 1, 2 and 3 (e.g. binary 00, 01, 10, 11 respectively). Finally, for purposes of this example, assume that node 400 has address "2" and therefore is allocated $T_{SLOT-2}$.

During time slots 0 and 1 (e.g. $T_{SLOT-0}$, $T_{SLOT-1}$), node 400 listens for bus signals on the bus 402 via its receiver 406. The receiver may be a discrete receiver, part of a transceiver, or any other receiving mechanism. The node 400 does not attempt to signal the bus 402 itself during time slots 0 and 1, as it is not yet its turn to signal the bus. The node 400 whether any other node is signaling the bus 402 by monitoring 408 for any bus signals. Assume that the node (not shown) at address "1" that has been allocated $T_{SLOT-1}$ has sent a message during its time slot. The receiver 406 of node 400 receives the signals, and it is determined 408 that signals are present on the bus. This notifies node 400 that it should not attempt to send a message during this time slot period, but rather that it should frame the message from the node at address "1" that is currently on the bus 402. Thus, if bus signaling is detected 408, the node 400 buffers the message 410. As previously indicated, the node 400 need only have enough buffer capacity to store one message, as only one message will be included in a transmitted frame.

The buffered message is then framed by the framing module 412. Among other things, framing the message enables the node 400 to identify the end of the frame (EOF). When the EOF is recognized 414, the EOF establishes 416 the new time reference for the next time slot period. For example, the new time reference for measuring time slot allocations for the next frame may be the EOF for the current message. Alternatively, the new time reference may start some predetermined time after the EOF, such as some number of clock cycles, some time duration, and/or other triggering event based on the EOF or the actual end of the transmitted frame (e.g., after the CRC). In one embodiment, each of the nodes frames the signals on the bus in the same manner, such that each will recognize the EOF substantially concurrently, whereby the EOF or actual end of the frame can be used as the new time reference for the subsequent frame. A timer module 418 can be used to measure the time from the new time reference until it is the node 400's turn to have access to the common bus 402.

In addition to determining the new start of the next time slot period, the node 400 can determine 420 whether the message on the bus 402 was targeted for the node 400. For example, in connection with framing 412 the message, the node 400 may determine that the destination address in the frame corresponds to the node 400's address, thereby indicating that the message was directed to the node 400. If the message was targeted for the node 400, it can process 422 the message. Otherwise, the node 400 disregards 424 the message.

If no node having a time slot prior to node 400's time slot sent a message, then node 400 can send a message at its time slot $T_{SLOT-2}$ if it has a message to send. For example, the node 400 monitors 408 for bus signals. If node 400 has a message to send as determined at decision block 426, it is determined 428 whether it is node 400's allocated time slot (e.g. $T_{SLOT-2}$). If not, node 400 continues to wait until it's time slot arises and no other node has sent a message during the time slot period. If no prior node has sent a message, and node 400 has a message to send 426 when it is node 400's proper time slot 428, node 400 can send its message. For example, the message may be framed by the frame generation module 430, and sent on the shared bus 402 via the transmitter 432. In one embodiment, all other listening nodes will then detect the bus signaling, buffer and frame the message, and thereby establish the new start of the next time slot period using the EOF of the frame sent by the node 400. In this manner, the frame is sent from a node when the message is ready to transmit during its time slot, and the next time slot period will begin when the EOF (or other indication) of the transmitted message is detected by each of the nodes sharing the bus 402.

Figure 5A:
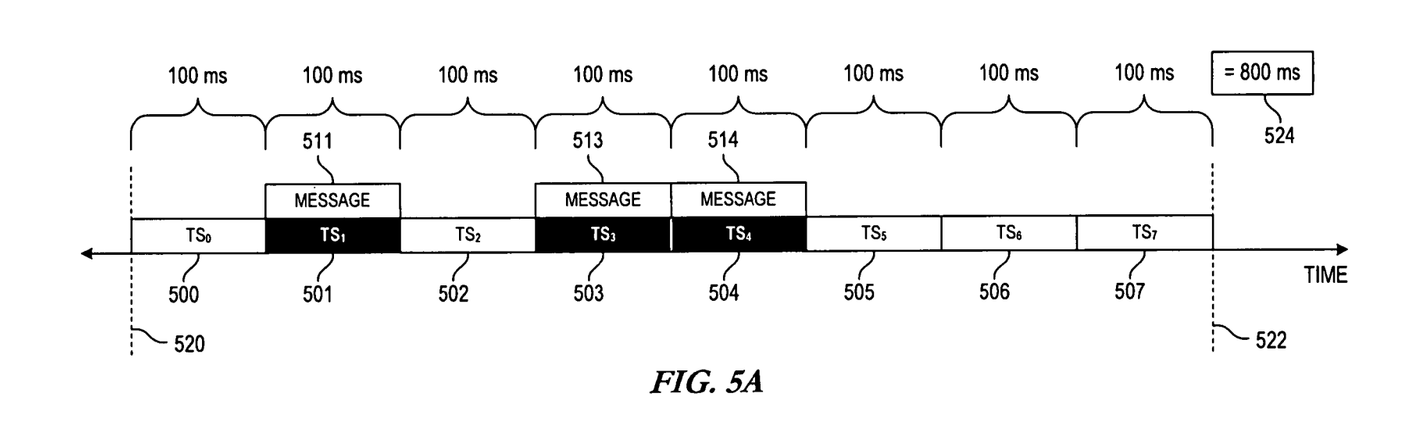
FIGS. 5A and 5B illustrate a comparison of a representative manner for timing access to a shared communications bus in accordance with the invention, relative to a manner of allowing access to a shared bus by allowing each device to include a message during a time slot period.
Figure 5B:
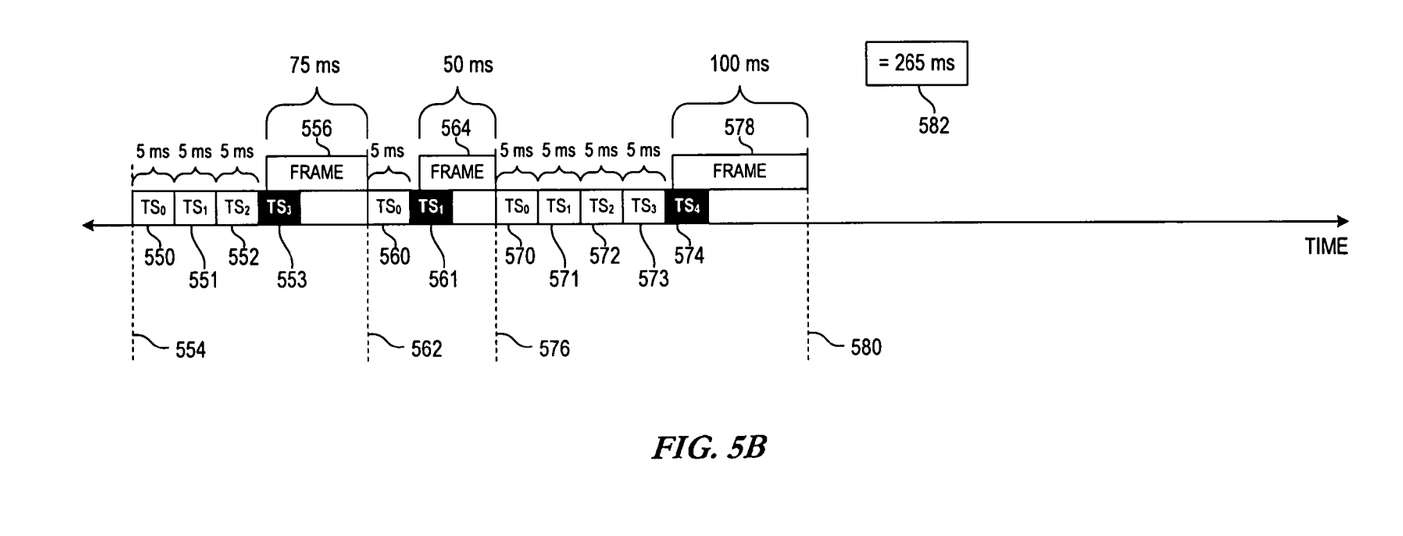

FIGS. 5A and 5B illustrate a comparison of a representative manner for timing access to a shared communications bus in accordance with the invention, relative to a manner of allowing access to a shared bus by allowing each device to include a message during a frame. Referring first to FIG. 5A, the example involves seven nodes, each with a respectively allocated time slot depicted as $TS_0$ 500, $TS_1$ 501, $TS_2$ 502, $TS_3$ 503, $TS_4$ 504, $TS_5$ 505, $TS_6$ 506 and $TS_7$ 507. In this example, each of the nodes is provided a predetermined time from the start 520 of the frame to the end 522 of the frame. During each node's respective time slot, it is allocated a time slot sufficient to send a message of maximum length. This time is allocated whether or not each given node has a message to send. In the illustrated example, each time slot is 100 ms, and thus a total of 800 ms 524 is consumed by the frame.

More particularly, it is assumed that the nodes allocated time slots $TS_1$, 501 $TS_3$ 503 and $TS_4$ 504 have messages to send. A first time slot $TS_0$ 500 is allocated to the node (not shown) assigned to $TS_0$ 500, and this node has no message to send. When the time slot duration (e.g. 100 ms) has expired, the node allocated the next time slot $TS_1$ 501 is offered an opportunity to send a message, and this node has a message 511 to send. This message will form part of the entire frame. The node allocated $TS_2$ 502 has no message to send, and the next nodes must wait until the 100 ms period expires. The nodes allocated the next two time slots $TS_3$ 503 and $TS_4$ 504 have messages 513, 514 to send, and they include their messages in the frame during their respective time slots $TS_3$ 503 and $TS_4$ 504. While the nodes allocated time slots $TS_5$ 505, $TS_6$ 506 and $TS_7$ 507 have no messages to send, the frame is not sent until each of these time periods 505, 506, 507 have expired. A frame is ultimately sent with messages 511, 513 and 514 after the 800 ms waiting period.

In contrast, FIG. 5B illustrates a representative example of how the same three messages can be sent in a significantly lesser time. As previously indicated, the duration of a time slot in the example of FIG. 5B need not have a width (i.e. time) sufficient to accommodate the entire length of a message. Rather, the time slot duration can be much shorter than the maximum length of a message. In one embodiment, time slots are only as wide as required to ensure they do not overlap when timing tolerances are considered. A time slot of a small number of characters can suffice to identify a message being transmitted, while the remainder of the message can bleed over into what would have otherwise been succeeding time slots. This is possible because only one message will be included in the data frame, and those time slots following the time slot of the transmitting node will not be considered until the next data frame. Thus, in the example of FIG. 5B, each of the time slots requires, for example, only 5 ms.

For the example of FIG. 5B, it is assumed that the nodes allocated $TS_0$ 550, $TS_1$ 551 and $TS_2$ 552 have no message to send. The time slots are measured by each node from the starting time reference 554, and each time slot is set to approximately 5 ms in the illustrated embodiment. The node associated with $TS_3$ 553 has a message to send, and initiates the message frame 556 during $TS_3$ 553. In this example, it is assumed that the message frame 556 takes approximately 75 ms to send, based largely on the length of the embedded message. In accordance with the invention, a new time reference 562 is established for the next message/frame transmission which is based on the EOF of the prior message frame 556. Thus, approximately 90 ms (5+5+5+75) was consumed for the node associated with $TS_3$ 553 to send its message.

During the next time slot period reference from the new start time reference 562, it is assumed that the node allocated $TS_0$ 560 has no message to send. The node associated with $TS_1$ 561 has a message to send, and initiates the message frame 564 during $TS_1$ 561. In this example, it is assumed that the message frame 564 takes approximately 50 ms to send. In accordance with the invention, a new time reference 576 is established for the next message/frame transmission which is based on the EOF of the prior message frame 564. Thus, an additional, approximate 55 ms (5+50) was consumed for the node associated with $TS_1$ 561 to send its message.

During the next time slot period reference from the new start time reference 576, it is assumed that the nodes allocated $TS_0$ 570, $TS_1$ 571, $TS_2$ 572 and $TS_3$ 573 have no message to send. The node associated with $TS_4$ 574 has a message to send, and initiates the message frame 578 during $TS_4$ 574. In this example, it is assumed that the message frame 578 takes approximately 100 ms to send. In accordance with the invention, the time slot period ends in connection with or otherwise determinable by the EOF 580 of the frame 578. Thus, an additional, approximate 120 ms (5+5+5+5+100) was consumed for the node associated with $TS_4$ 574 to send its message.

As can be seen, the example of FIG. 5A required 800 ms 524 to transmit messages from the nodes associated with time slots $TS_1$ 501, $TS_3$ 503 and $TS_4$ 504. To transmit the same messages from the same nodes, the example of FIG. 5B representing an embodiment of the invention required only approximately 265 ms 582. The embodiment of FIG. 5B allows at most one node to send a message during a given time slot period, and each sent frame is treated as a time reference for the next time slot period. That is, the end of each frame transmitted onto the shared bus represents the time reference for the next time slot period. Not only do the receiving nodes require significantly less memory capacity to buffer a single message, unused time slots are minimized by foregoing the wait for any time slots following a time slot in which a message is associated.

Figure 6:
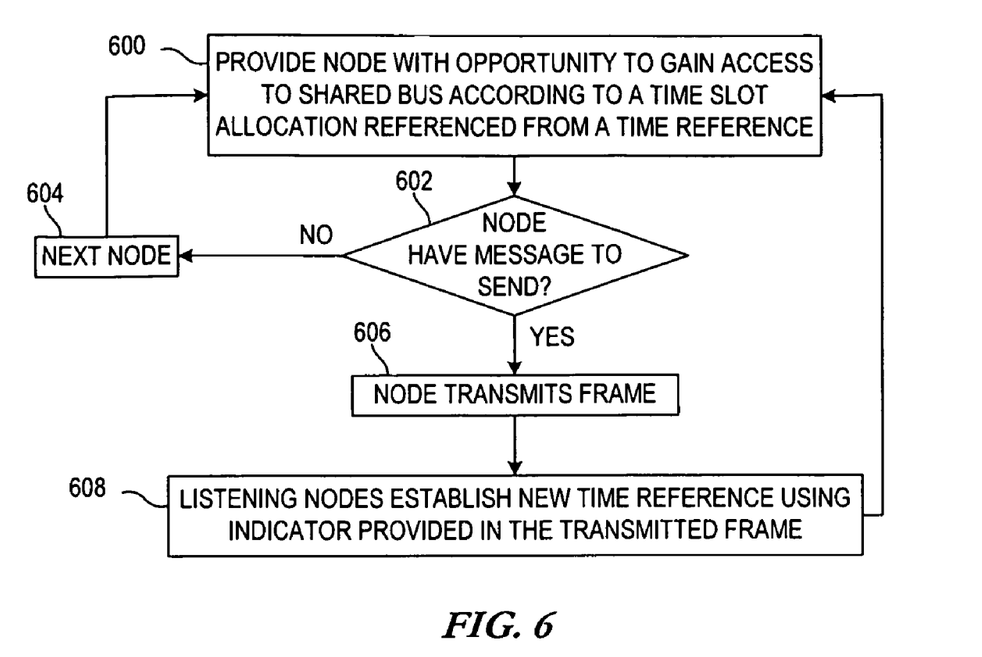
FIG. 6 is a flow diagram illustrating a representative embodiment of a method for timing access to a shared communications bus in accordance with the present invention.

FIG. 6 is a flow diagram illustrating a representative embodiment of a method for timing access to a shared communications bus in accordance with the present invention. The representative method includes successively providing each of a plurality of nodes an opportunity to gain access to a shared bus according to a time slot allocation referenced from a time reference, until one of the nodes has a message to send via the shared bus. The embodiment of FIG. 6 performs this by providing 600 a node with the opportunity to gain access to a shared bus according to a time slot allocation referenced from a time reference. If the node does not have a message to send during its time slot as determined at decision block 602, the next node 604 is then provided 600 with its opportunity to gain access to the bus. This continues until a node has a message to send, whereby the node transmits 606 a frame to provide the message via the bus.

A new time reference is established 608 at each of the listening nodes based on an indication provided by the transmitted frame. In one embodiment, the indication provided by the transmitted frame is the end of frame (EOF) indication. A node, based again on the time slot allocation of the nodes, is again provided 600 an opportunity to gain access to the shared bus according to the time slot allocation. However, the time slot allocation is now referenced from the new time reference. If the node does not have a message to send during its time slot as again determined at decision block 602, the next node 604 is again provided 600 the opportunity to gain access to the bus at its time slot. This again continues until a node has a message to send 602, at which time the node transmits 606 the new frame to provide the message via the bus. Again, the listening nodes establish 608 yet another new time reference using the indicator provided in the recently transmitted frame.

Figure 7:
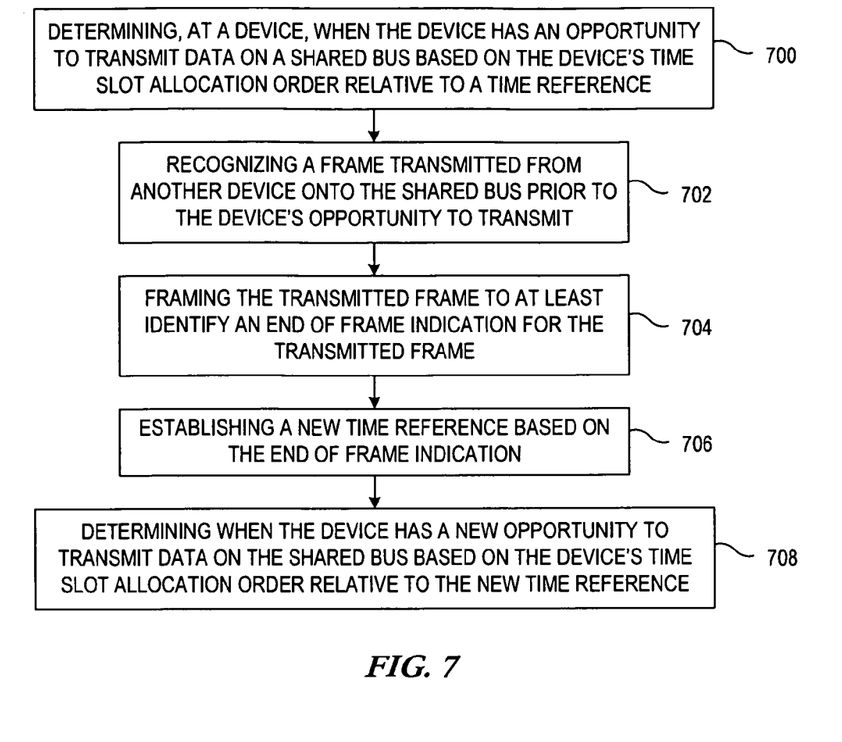
FIG. 7 is a flow diagram illustrating a representative embodiment of a method for timing access to a shared bus from the perspective of a listening device on the shared bus.

FIG. 7 is a flow diagram illustrating a representative embodiment of a method for timing access to a shared bus in accordance with the invention, from the perspective of a listening device on the shared bus. The device determines 700 when it has the opportunity to transmit data on the shared bus based on the device's time slot allocation order relative to a time reference. A frame, that is transmitted from another device onto the bus prior to the device's opportunity to transmit, is recognized 702 by the device. The transmitted frame is framed 704 at the device in order to at least identify an end of frame indication for the transmitted frame. A new time reference is established 706, based on the end of frame indication. It can again be determined 708 when the device has a new opportunity to transmit any data it may have onto the shared bus, but now based on the device's time slot allocation order relative to the new time reference. This process can continue as nodes transmit frames onto the bus. At any time that no message is transmitted prior to the device's opportunity to transmit, the device can transmit its own message during its allocated time slot relative to the most recently created time reference, whether created by an end of frame message from another node or from a backstop message.

Figure 8:
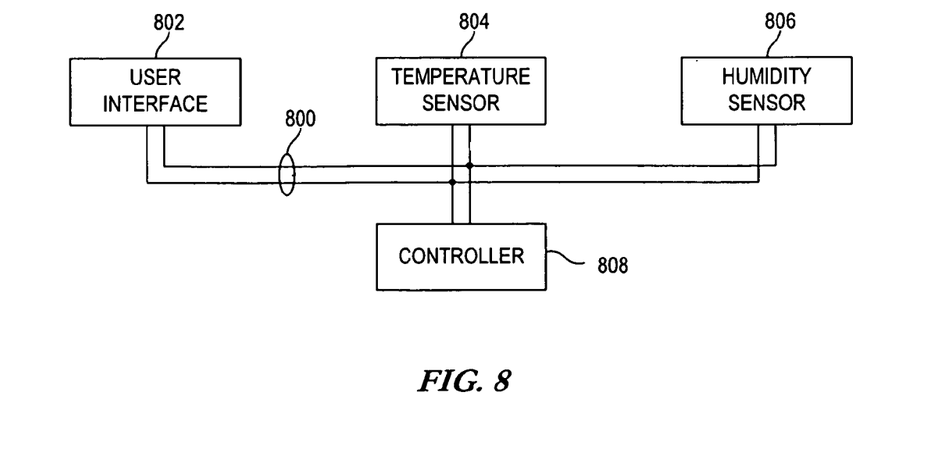
FIG. 8 illustrates an example of an heating, ventilation and air conditioning (HVAC) system in which the principles of the present invention may be implemented

The present invention can be used in any system employing two or more nodes and a shared communications bus. In one embodiment, the invention is implemented in an environmental control system, such as a heating, ventilation and air conditioning (HVAC) system. FIG. 8 illustrates an example of an HVAC system in which the principles of the present invention may be implemented. In the illustrated embodiment, the shared bus 800 is a two-wire bus. Devices on the bus may include, for example, a user interface 802, temperature sensor 804, humidity sensor 806 and a controller 808. Other devices such as thermostats and/or other environmental devices may also or alternatively be coupled to the bus. The user interface 802 can present information, such as a current temperature, humidity, etc. It can also enable a user to enter information and/or activate mechanisms to perform functions. Sensors such as the temperature sensor 804 and humidity sensor 806 determine area temperature and humidity respectively. These and/or other devices (nodes) can communicate with a controller 808, which processes messages from the other devices for purposes of the HVAC functionality. The controller 808 may be designated as the device that issues backstop messages if none of the nodes on the bus 800 send a message during the time slot period. It should be recognized that the HVAC example of FIG. 8 is provided for purposes of example, as the invention is equally applicable to other systems such as security systems, automotive systems, etc.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined from the scope of the claims appended hereto.

What is claimed is:

1. A method comprising:
   successively providing each of a plurality of nodes an opportunity to gain access to a shared bus according to a time slot allocation referenced from a time reference, until one of the nodes has a message to send via the shared bus;
   transmitting a frame from the node that has the message to send;
   establishing a new time reference at each of the nodes based on an indication provided by the transmitted frame; and
   successively providing each of the plurality of nodes the opportunity to gain access to the shared bus according to the time slot allocation referenced from the new time reference, until one of the nodes has a message to send via the shared bus.

2. The method of claim 1, wherein establishing a new time reference at each of the nodes comprises establishing the new time reference based on an end of frame indication provided by the transmitted frame.

3. The method of claim 1, wherein establishing a new time reference at each of the nodes comprises establishing the new time reference upon recognition of an end of the transmitted frame.

4. The method of claim 1, further comprising assigning an allocation order in which each of the plurality of nodes is allowed to sequentially gain access to the shared bus.

5. The method of claim 4, wherein assigning an allocation order comprises providing each of the nodes the opportunity to access the shared bus in an order corresponding to an increasing order of the addresses of the plurality of nodes.

6. The method of claim 1, further comprising each of the plurality of nodes receiving and framing the transmitted frame to at least identify the indication provided by the transmitted frame.

7. The method of claim 6, further comprising each of the plurality of nodes buffering the transmitted frame transmitted by the transmitting node.

8. The method of claim 7, further comprising using a common buffer at each of the nodes to both receive and transmit frames.

9. The method of claim 1, wherein each allocated time slot is of a lesser time duration than a maximum length of the message sent by the plurality of the nodes.

10. The method of claim 9, wherein each allocated time slot has a time duration sufficient to enable a listening node on the shared bus to identify that a message has been transmitted, and wherein transmitting a frame from the node that has the message to send comprises initiating transmission of the frame during the time slot of the sending node and transmitting the frame for a time that would have otherwise encompassed one or more other subsequent time slots allocated to other listening nodes.

11. A method comprising:
    determining, at a device, when the device has an opportunity to transmit data on a shared bus based on the device's time slot allocation order relative to a time reference;
    recognizing data transmitted from another device onto the shared bus prior to the device's opportunity to transmit;
    framing the transmitted data to at least identify an end of frame indication for the transmitted data;
    establishing a new time reference determined from the end of frame indication; and
    determining when the device has a new opportunity to transmit data on the shared bus based on the device's time slot allocation order relative to the new time reference.

12. The method of claim 11, further comprising determining whether the device is a destination of the transmitted data based on a destination address identified by framing the transmitted data.

13. The method of claim 11, further comprising recognizing that no data has been transmitted from another device onto the shared bus prior to the device's opportunity to transmit, and transmitting a frame from the device onto the bus at the device's time slot allocation order relative to the new time reference.

14. The method of claim 11, wherein determining when the device has an opportunity to transmit data comprises measuring a time until the device's time slot presents itself in the time slot allocation order.

15. An apparatus capable of communicating via a shared bus, comprising:
- a receiver coupled to the shared bus and configured to receive data originating from other nodes coupled to the shared bus; and
- a processor configured to determine when the apparatus is allowed to transmit a message based on a time slot allocated for the apparatus relative to a time reference, to frame the data received prior to the apparatus' time slot, to establish a new time reference based on an indication in the received data, and to determine when the apparatus is allowed to transmit a message based on the time slot relative to the new time reference.

16. The apparatus of claim 15, wherein the processor is further configured to frame an outgoing message when the apparatus is allowed to transmit a message during its time slot, and further comprising a transmitter configured to transmit the outgoing message via the shared bus.

17. The apparatus of claim 15, wherein the processor is configured to establish the new time reference based on an end of file indication in the received and framed data.

18. The apparatus of claim 17, wherein the processor comprises a framing module configured to frame the received data to identify the end of file indication in the received data by which the new time reference is established.

19. The apparatus of claim 15, further comprising a buffer configured to buffer the received data, and having a capacity commensurate with a size of the largest single data block sent by any of the other nodes coupled to the shared bus.

20. A system comprising:
- a shared communications bus;
- a plurality of environmental devices capable of communicating via the shared communications bus, each of the environmental devices comprising:
  - means for determining when the respective device has an opportunity to transmit a frame on the shared communications bus based on the respective device's time slot allocation order relative to a time reference;
  - means for receiving frames originating from the one or more other environmental devices coupled to the shared bus;
  - means for framing the received frame to at least identify an end of the received data frame;
  - means for establishing a new time reference based on the end of the received data frame for determining subsequent frame transmission opportunities.

21. The system of claim 20, wherein at least one of the environmental devices comprises a temperature sensor.

22. The system of claim 20, wherein at least one of the environmental devices comprises a humidity sensor.

23. The system of claim 20, wherein at least one of the environmental devices comprises a thermostat.

24. The system of claim 20, wherein at least one of the environmental devices comprises an environmental controller coupled a heating, ventilation and air conditioning (HVAC) system to control the HVAC system.

* * * * *